United States Patent
Zielinski et al.

(10) Patent No.: US 11,364,878 B2
(45) Date of Patent: Jun. 21, 2022

(54) DUAL ACTION WIPER SYSTEM

(71) Applicant: Honda Motor Co., Ltd., Tokyo (JP)

(72) Inventors: Kurt A. Zielinski, Lakewood, CA (US); Eric J Schumaker, San Pedro, CA (US)

(73) Assignee: Honda Motor Co., Ltd., Tokyo (JP)

( * ) Notice: Subject to any disclaimer, the term of this patent is extended or adjusted under 35 U.S.C. 154(b) by 30 days.

(21) Appl. No.: 16/916,758

(22) Filed: Jun. 30, 2020

(65) Prior Publication Data

US 2021/0402959 A1 Dec. 30, 2021

(51) Int. Cl.
*B60S 1/28* (2006.01)
*B60S 1/04* (2006.01)
*B60S 1/16* (2006.01)
*B60S 1/08* (2006.01)

(52) U.S. Cl.
CPC .............. *B60S 1/28* (2013.01); *B60S 1/0452* (2013.01); *B60S 1/163* (2013.01); *B60S 1/0402* (2013.01); *B60S 1/0814* (2013.01)

(58) Field of Classification Search
CPC ........ B60S 1/28; B60S 1/0402; B60S 1/0452; B60S 1/185; B60S 1/163; B60S 1/0814
USPC .... 15/250.28, 250.3, 250.16, 250.27, 250.14
See application file for complete search history.

(56) References Cited

U.S. PATENT DOCUMENTS

| | | | | |
|---|---|---|---|---|
| 3,440,679 A * | 4/1969 | Frederick | ............ | B60S 1/0402 15/250.04 |
| 4,665,488 A * | 5/1987 | Graham | ............ | B60S 1/0814 15/250.12 |
| 4,672,709 A * | 6/1987 | Licata | ............ | B60S 1/245 15/250.21 |
| 5,256,950 A * | 10/1993 | Matsumoto | ............ | B60S 1/0814 318/443 |
| 5,983,439 A * | 11/1999 | Hojnacki | ............ | B60S 1/166 15/250.17 |
| 9,114,694 B2 | 8/2015 | Sasaki | | |

(Continued)

FOREIGN PATENT DOCUMENTS

| | | |
|---|---|---|
| DE | 102012206767 A1 | 10/2013 |
| DE | 102014202560 A1 | 8/2015 |

(Continued)

OTHER PUBLICATIONS

Machine translation of description portion of EP publication 0017576, published Oct. 1980. (Year: 1980).*

*Primary Examiner* — Gary K. Graham
(74) *Attorney, Agent, or Firm* — Morgan Lincoln; American Honda Motor Co., Inc.

(57) ABSTRACT

A wiper system for a vehicle is provided. The wiper system includes a driving assembly. The wiper system further includes a supplementary wiper having a first end that is coupled to a first pivot point of the driving assembly. When the wiper system is activated, the driving assembly is configured to swing the supplementary wiper about the first pivot point from a resting position to an extended position. The supplementary wiper is configured to be statically disposed at the extended position to prevent water from passing over one of two A-pillars of the vehicle to a side window of the vehicle. When the wiper system is deactivated, the driving assembly is configured to stow the supplementary wiper back from the extended position to the resting position.

15 Claims, 5 Drawing Sheets

(56) References Cited

U.S. PATENT DOCUMENTS

| | | | | |
|---|---|---|---|---|
| 2005/0217699 A1* | 10/2005 | Murakami | ............... | B60S 1/28 |
| | | | | 134/6 |
| 2008/0216868 A1* | 9/2008 | Karcher | ............... | B60S 1/0814 |
| | | | | 134/6 |
| 2009/0119866 A1* | 5/2009 | Amagasa | .............. | B60S 1/0814 |
| | | | | 15/250.31 |
| 2010/0320796 A1 | 12/2010 | Hoefer et al. | | |
| 2016/0332599 A1 | 11/2016 | Barretta et al. | | |

FOREIGN PATENT DOCUMENTS

| | | | |
|---|---|---|---|
| EP | 0017576 | * | 10/1980 |
| JP | 58-185354 | * | 10/1983 |
| KR | 19980031140 U | | 8/1998 |
| WO | 2008040683 A1 | | 4/2008 |

* cited by examiner

DUAL ACTION WIPER SYSTEM

BACKGROUND

Windshield wipers are devices which are commonly used in vehicles to remove rain, snow, ice, or other forms of debris from the vehicle's front window. When a windshield wiper is activated, rainwater falling on the windshield may be directed to a particular side of a vehicle and further into a channel. For example, the rainwater moving towards an A-pillar on a driver's side of the vehicle may pool up in a groove or channel that may be formed between the windshield and the A-Pillar. The pooled rainwater may move downwards, upwards, or may pass over the channel and the A-pillar, and spill onto a side window of the vehicle. The rainwater accumulating on the side window may obstruct driver's view from the side window. In some instances, having such a groove or channel may generate drafting and wind noise that may impact aerodynamics of the vehicle.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a wiper system for a vehicle. The wiper system may include a driving assembly and a supplementary wiper having a first end that may be coupled to a first pivot point of the driving assembly. When the wiper system is activated, the driving assembly may be configured to swing the supplementary wiper about the first pivot point from a resting position proximal to a windshield cowl of the vehicle to an extended position that may be proximal to a first end of a windshield and adjacent to one of two A-pillars of the vehicle. The supplementary wiper may be configured to be statically disposed at the extended position to prevent water from passing over one of the two A-pillars of the vehicle to a side window of the vehicle. When the wiper system is deactivated, the driving assembly may be configured to stow the supplementary wiper back from the extended position to the resting position.

Another exemplary aspect of the disclosure provides a control system. The control device may include an Electronic Control Unit (ECU) communicatively coupled to a driving assembly. The ECU may be configured to control the driving assembly to swing a supplementary wiper about a first pivot point of the driving assembly, from a resting position to an extended position. The supplementary wiper may have a first end coupled to the first pivot point. At the extended position, the supplementary wiper may be configured to be statically disposed adjacent to a first A-pillar of a vehicle to prevent water from passing over the first A-pillar of the vehicle to a side window of the vehicle. The ECU may be further configured to control the driving assembly to stow the supplementary wiper back from the extended position to the resting position.

Another exemplary aspect of the disclosure provides a method for controlling a driving assembly of a wiper system. The method may include controlling a driving assembly to swing a supplementary wiper about a first pivot point of the driving assembly, from a resting position to an extended position. The supplementary wiper may have a first end coupled to the first pivot point. At the extended position, the supplementary wiper may be configured to be statically disposed adjacent to a first A-pillar of a vehicle to prevent water from passing over the first A-pillar of the vehicle to a side window of the vehicle. The method may further include controlling the driving assembly to stow the supplementary wiper back from the extended position to the resting position.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1:
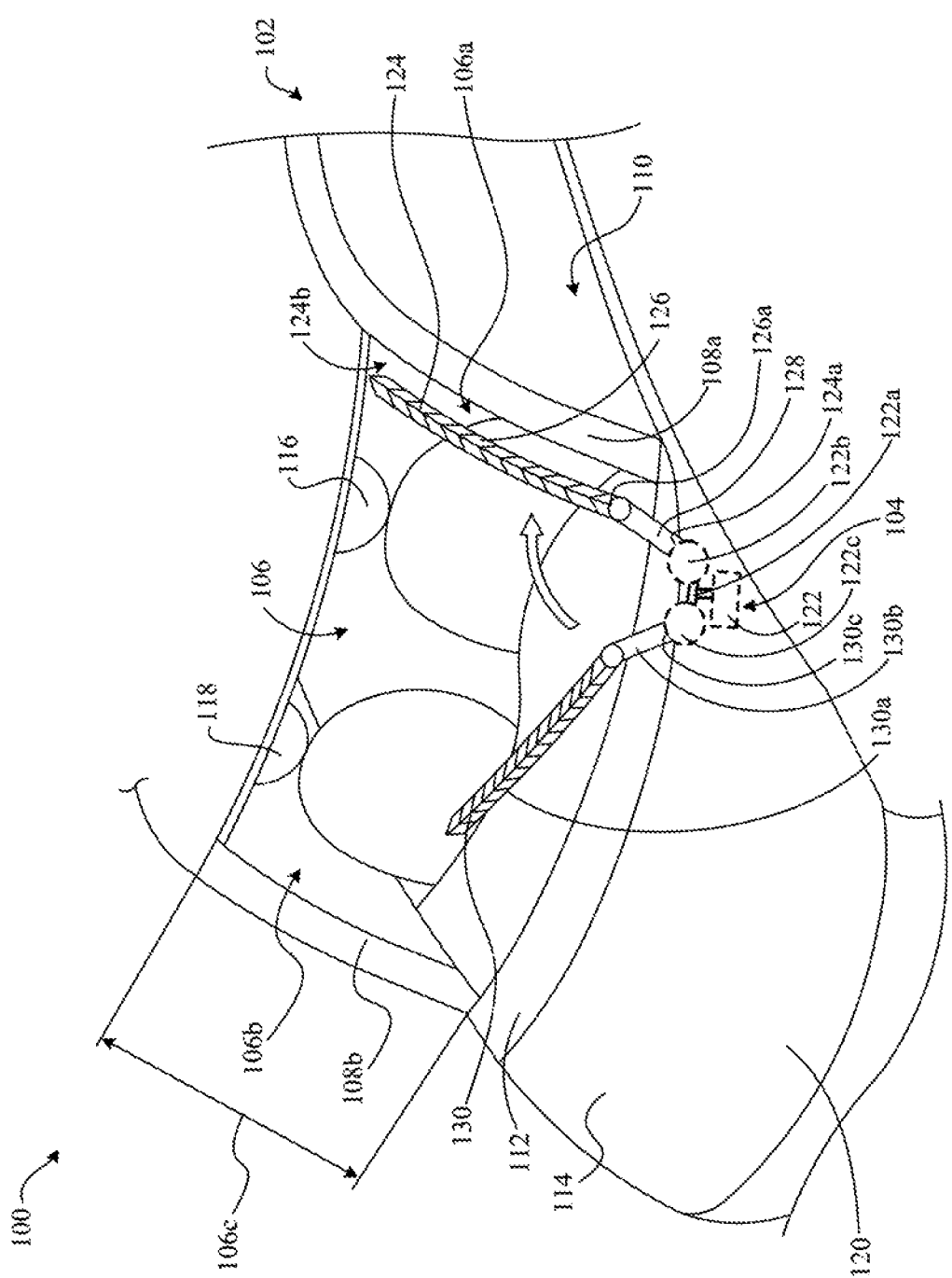
FIG. 1 is a diagram of an exemplary wiper system for a vehicle, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may provide a wiper system for a vehicle. The wiper system may include a driving assembly and a supplementary wiper that may be coupled to the driving assembly. When the driving assembly is activated, the driving assembly may be configured to swing the supplementary wiper from a resting position to an extended position. At the extended position, the supplementary wiper may be configured to be statically disposed proximal to an end of a windshield and adjacent to one of two A-pillars of the vehicle. Thus, at the extended position, the supplementary wiper may act as a barrier which may prevent the water from passing over the one of the two A-pillars of the vehicle to a side window of the vehicle. This may present an issue of water reaching the side window from channels that may be between the windshield and A-pillars and passing over to the side window to obstruct a driver's view from the side window.

At the extended position, the statically disposed supplementary wiper may be configured to form a water column with the windshield to prevent the water from passing over one of the two A-pillars of the vehicle to the side window. For example, the water column may form a barrier, which creates a space/volume where the water may pool up and subsequently flow downwards without passing over one of the two A-pillars of the vehicle to the side window. As the supplementary wiper itself may be configured to form the water column with the windshield, there may not be a need for a separate groove or channel between the windshield and each of the two A-pillars to collect the rainwater that may fall onto the windshield. As there may not be a need for a separate groove or channel, at least one of the two A-pillars may be flush with a respective end of the windshield. With the flush, the ends of the individual A-pillars may be in direct contact with the respective ends of the windshield so that the ends of the A-pillar level up or even up with the respective ends of the windshield to form a single smooth surface without any protrusions or indentations. This may help to eliminate a drafting and/or wind noise and may improve aerodynamics of the vehicle when the vehicle is in motion. When the driving assembly is deactivated, the driving assembly may be configured to stow the supplementary wiper back from the extended position to the resting position. At the resting position, the supplementary wiper may be stowed inside a compartment that may be located proximal or directly beneath a windshield cowl or a hood of the vehicle. When stowed inside the compartment, the vehicle may have improved aesthetics and performance life of the supplementary wiper may increase.

The disclosed wiper system may include provisions to have a primary wiper arrangement for the windshield, which may operate in tandem with the supplementary wiper. The primary wiper arrangement may include one or more wiper blades, which may reciprocally move similar to a typical wiping action of wiper blades in conventional vehicles.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a diagram of an exemplary wiper system for a vehicle, in accordance with an embodiment of the disclosure. With reference to FIG. 1, there is shown a diagram 100 of a vehicle 102 that includes a wiper system 104. As shown, for example, the vehicle 102 is a four-wheeler vehicle that includes a windshield 106 extending between two A-pillars 108a-108b of the vehicle 102. The present disclosure may be also applicable to other types of vehicles. Examples of other types of the vehicle 102 may include, but are not limited to, a car, a truck, an all-terrain-vehicle (ATV), a bus, a locomotive, a flying vehicle (such as an airplane), a water-borne vehicle (such as a ship). The description of such vehicles is omitted from the disclosure for the sake of brevity.

The vehicle 102 may further include a side window 110 disposed adjacent to the one of the two A-pillars 108a-108b, a windshield cowl 112, and a hood 114 that may pivotally cover an engine (not shown) of the vehicle 102. The vehicle 102 may further include a driver seat 116 to accommodate a driver (not shown), and a passenger seat 118 to accommodate a passenger (not shown). The two A-pillars 108a-108b may be located on a front side 120 of the vehicle 102 and may include a first A-pillar 108a that may be disposed proximal to the driver seat 116 of the vehicle 102 and a second A-pillar 108b that may be disposed proximal to the passenger seat 118 on the front side 120 of the vehicle 102. Also, the first A-pillar 108a may be configured to be flush with a first end 106a of the windshield 106 and the second A-pillar 108b may be configured to be flush with a second end 106b of the windshield 106.

The vehicle 102 may also include other suitable components or systems, in addition to the components or systems illustrated herein to describe and may explain the function and operation of the present disclosure. A description of such components or systems is omitted herein for the sake of brevity. It should be noted that the vehicle 102 in FIG. 1 is a four-wheeler vehicle and is merely provided as an example. The vehicle 102, as shown in FIG. 1, should not be construed as limiting for the scope of the present disclosure. The present disclosure may also be applicable to other types of vehicles, without departing from the scope of the present disclosure.

The wiper system 104 may include a driving assembly 122 and a supplementary wiper 124 that may be coupled to the driving assembly 122. The driving assembly 122 may be configured to control a movement (and/or actuation) of the supplementary wiper 124. In an embodiment, the driving assembly 122 may be configured to be concealed by the windshield cowl 112. The driving assembly 122 may include a driving implement (not shown), a wiper linkage 122a, and a suitable gear mechanism (not shown). Examples of the driving implement may include, but not limited to, an electrical driving implement (such as, permanent magnet DC motor or a shunt motor), a pneumatic driving implement, or a hydraulic driving implement. The driving implement may be coupled to the wiper linkage 122a through the gear mechanism. For example, the gear mechanism may include a worm gear or a bevel gear that may transform a rotational movement of the driving implement to a linear movement of the wiper linkage 122a.

Figure 2:
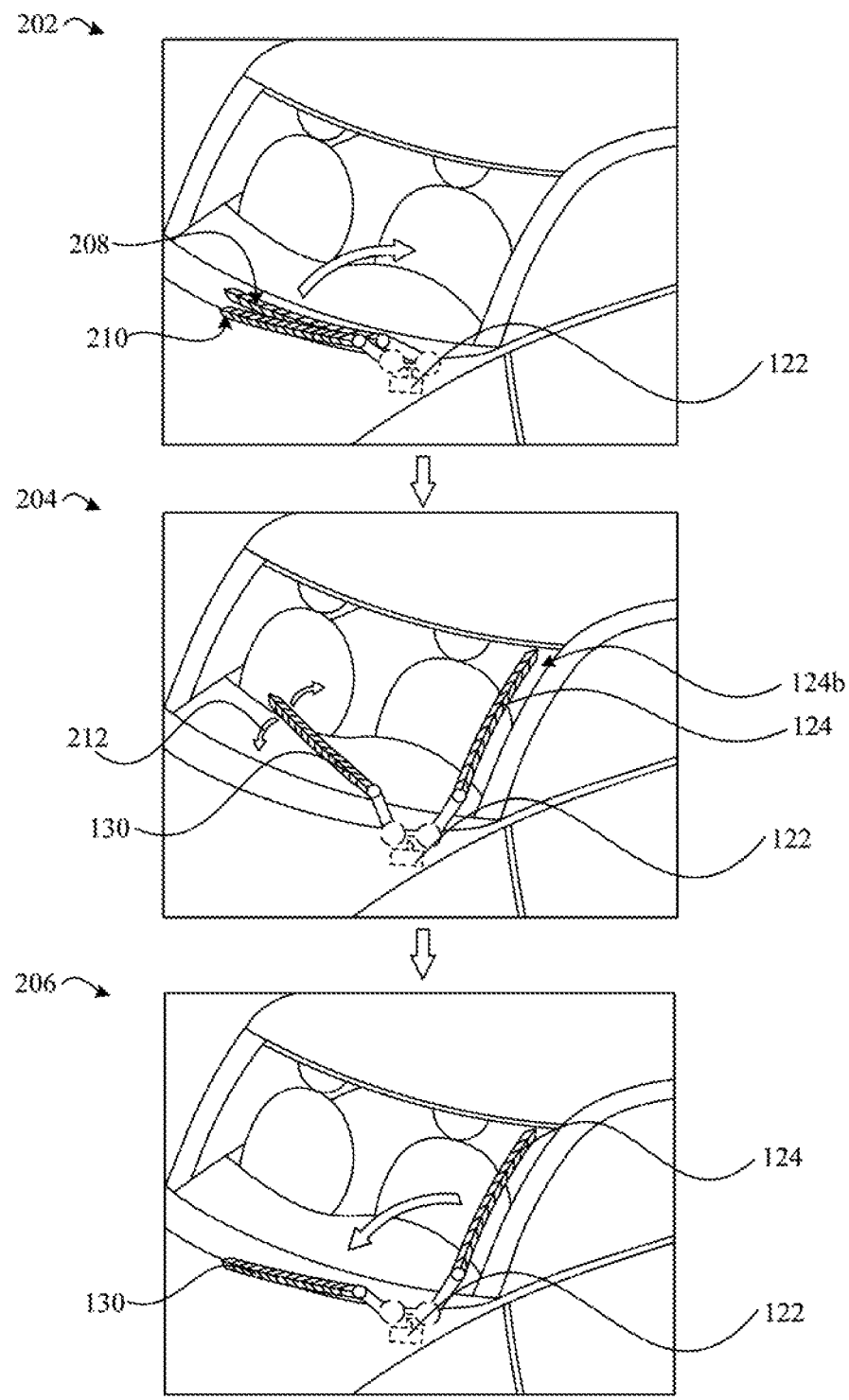
FIG. 2 is a diagram that illustrates exemplary stages of operations of the wiper system of FIG. 1, in accordance with an embodiment of the disclosure.

The supplementary wiper 124 may have a first end 124a that may be coupled to the wiper linkage 122a through a first pivot point 122b of the driving assembly 122. When activated, the driving assembly 122 may be configured to swing the supplementary wiper 124 between a resting position (as shown in FIG. 2, for example) and an extended position 124b. The resting position of the supplementary wiper 124 may be located directly above the windshield cowl 112 or the hood 114 of the vehicle 102. In an embodiment, the resting position of the supplementary wiper 124 may be located inside the windshield cowl 112 or the hood 114 of the vehicle 102. The extended position 124b of the supplementary wiper 124 may be located proximal to the first end 106a of the windshield 106 and adjacent to the first A-pillar 108a of the vehicle 102. In an embodiment, the extended position 124b of the supplementary wiper 124 may also be located proximal to the second end 106b of the windshield 106 and adjacent to the second A-pillar 108b of the vehicle 102. At the extended position 124b, the supplementary wiper 124 may be configured to extend to substantially cover a width 106c of the windshield 106 so as to act as a barricade, which may prevent water (such as rainwater) from flowing on to one of the two A-pillars 108a-108b and towards the side window 110 of the vehicle 102.

The supplementary wiper 124 may include a wiper blade 126 and a wiper arm 128 that may be coupled to the wiper blade 126. The wiper blade 126 may have a first end 126a that may be coupled to the wiper arm 128. In FIG. 1, the wiper blade 126 of the supplementary wiper 124 is shown to be disposed at the first end 106a of the windshield 106. However, the disclosure may not be so limiting and in some embodiments, the wiper blade 126 may be disposed even at the second end 106b of the windshield 106. In some other embodiments, the wiper blade at the first end 106a or the second end 106b may be disposed based on whether the vehicle 102 is a left-hand drive vehicle or a right-hand drive vehicle.

In FIG. 1, the wiper blade 126 of the supplementary wiper 124 is shown as a flat/beam blade. However, the present disclosure may not be so limiting and may be applicable to other suitable structures of the wiper blade 126, without departing from the scope of the present disclosure. Examples of such suitable structures of the wiper blade 126 may include a standard blade, a hybrid blade, and the like. The wiper blade 126 may also accommodate additional components, such as a wiper jet or a wiper spoiler. Details of such additional components are omitted from the disclosure for the sake of brevity.

The wiper arm 128 may have a suitable structure and design that may be configured to support the wiper blade 126 and transform the linear movement of the wiper linkage 122a to a sweeping movement (as shown in FIG. 2) of the wiper blade 126 between the resting position and the extended position 124b. In an embodiment, the wiper arm 128 may be coupled to the wiper linkage 122a through the first pivot point 122b of the driving assembly 122. The wiper arm 128 may support the wiper blade 126 at the first end 126a so that the wiper blade 126 may render a uniform and even pressure distribution on the windshield 106 at the extended position 124b of the supplementary wiper 124. Further, the wiper arm 128 may also render the uniform and even pressure distribution while swinging between the resting position and the extended position 124b. The wiper arm 128 may be configured to hold and support the wiper blade 126 to stay at the extended position 124b for a duration of the rainfall and stow back to the resting position when the rainfall stops or when the driver stops actuation of, or deactivates, the driving assembly 122. Although the wiper arm 128 is shown as a single arm structure in FIG. 1, the present disclosure may also be applicable to other arm configurations for the supplementary wiper. For example, the wiper blade 126 may also be supported by a set of wiper arms, which may be connected in series or in any other configuration to allow a greater degree of freedom with movement of the wiper blade on the windshield 106. For example, the set of wiper arms may support the wiper blade 126 from a midpoint of the wiper blade 126 and may branch out along the length of the wiper blade 126 to firmly support the wiper blade 126. In an embodiment, the wiper arm 128 may be adjustable in length so that the supplementary wiper 124 may be configured to move to substantially cover the width 106c of the windshield 106.

In at least one embodiment, the wiper system 104 may further include a primary wiper arrangement 130 that may be coupled to the driving assembly 122. Additionally, in some embodiments, the driving assembly 122 may be configured to control a movement (and/or actuation) of the primary wiper arrangement 130. The primary wiper arrangement 130 may have a suitable structure and design that may be configured to sweep external agents, such as water, dust, ice, etc., towards the supplementary wiper 124. In one embodiment, the primary wiper arrangement 130 and the supplementary wiper 124 may have identical structural designs. In an embodiment, the primary wiper arrangement 130 may include a wiper blade 130a and a wiper arm 130b. The wiper blade 130a and the wiper arm 130b of the primary wiper arrangement 130 may be identical or different from the wiper blade 126 and the wiper arm 128 of the supplementary wiper 124, respectively.

Figure 3:
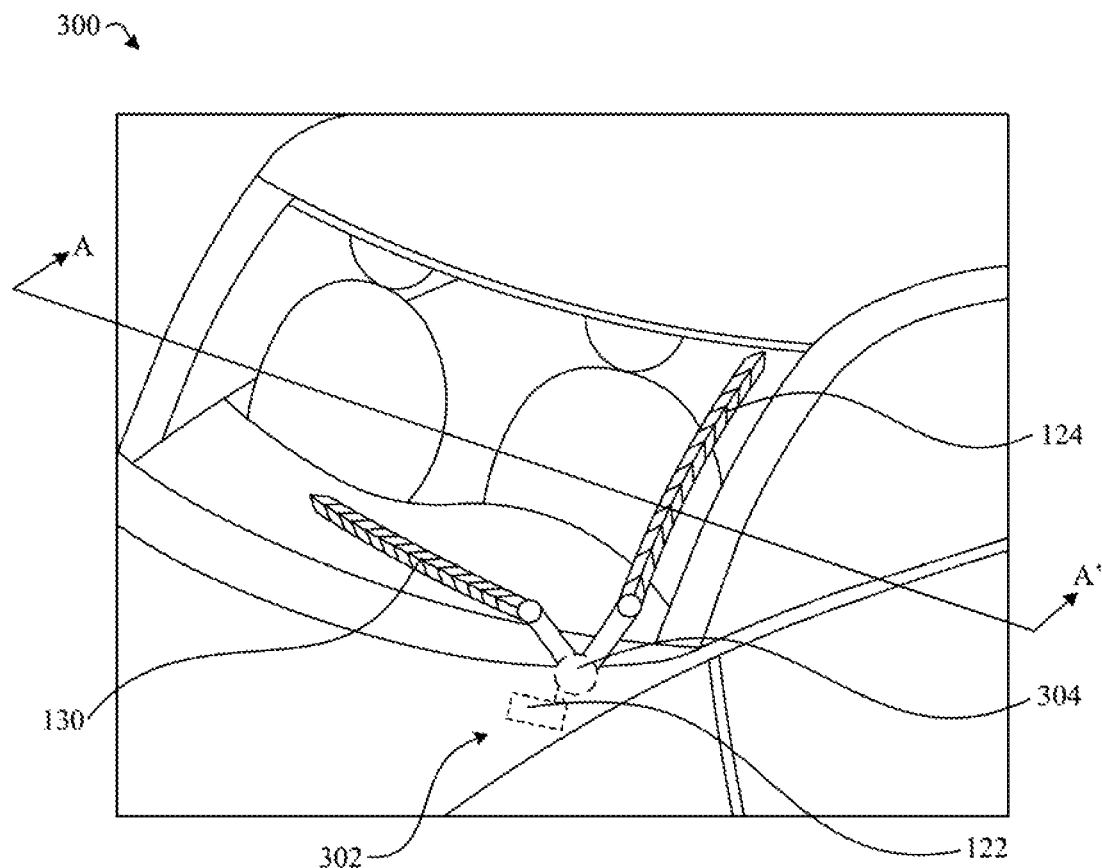
FIG. 3 is a diagram of an exemplary wiper system, in accordance with an embodiment of the disclosure.

The primary wiper arrangement 130 may include a first end 130c that may be coupled to the wiper linkage 122a through a second pivot point 122c of the driving assembly 122. As shown in FIG. 1, the first pivot point 122b and the second pivot point 122c are at different positions on the wiper linkage 122a of the driving assembly 122. Alternatively, in some embodiments, both the first pivot point 122b and the second pivot point 122c may coincide at a common position (as shown in FIG. 3) on the wiper linkage 122a of the driving assembly 122. In such a configuration, suitable implements may be used to differentially control the movement of the primary wiper arrangement 130 and the supplementary wiper 124 along a common pivot axis. An example of such a configuration of the primary wiper arrangement and the supplementary arrangement is shown in FIG. 3.

When activated, the driving assembly 122 may reciprocally swing the primary wiper arrangement 130 from a resting position (as shown in FIG. 2) to reciprocally sweep a defined windshield area. The resting position of the primary wiper arrangement 130 may be located proximal to the windshield cowl 112 of the vehicle 102. In FIG. 1, the primary wiper arrangement 130 is shown as a one-piece beam-style wiper. However, the disclosure may also be applicable to other types of wipers, or wiper configurations, without departing from the scope of the present disclosure. Examples of such types of wipers may include, but are not limited to, a tandem primary wiper or a traditional frame-style primary wiper.

FIG. 2 is a diagram that illustrates exemplary stages of operations of the wiper system of FIG. 1, in accordance with an embodiment of the disclosure. FIG. 2 is explained in conjunction with elements from FIG. 1. With reference to FIG. 2, there is shown exemplary stages of operations of the wiper system 104, such as a resting stage 202, an operational stage 204, and a deactivation stage 206.

In the resting stage 202, the wiper system 104 may be configured to be in an inactive state. In such a state, the supplementary wiper 124 may be disposed at a resting position 208. In one embodiment, the resting position 208 may be directly above the windshield cowl 112 or the hood 114 of the vehicle 102. Alternatively, for a concealed configuration, the resting position 208 may be located inside the compartment that may be directly beneath the windshield cowl 112 or the hood 114 of the vehicle 102. In at least one embodiment, the primary wiper arrangement 130 may also be disposed at the resting position 208 of the supplementary wiper 124 or a different resting position (such as a position 210), which may be adjacent to the resting position 208 of the supplementary wiper 124.

In the operational stage 204, the wiper system 104 may be configured to be activated from the inactive state to an active state. When activated to the active state, the driving assembly 122 may be configured to swing the supplementary wiper 124 about the first pivot point 122b from the resting position 208 proximal to the windshield cowl 112 of the vehicle 102 to the extended position 124b that may be proximal to the first end 106a of the windshield 106 and adjacent to the first A-pillar 108a of the vehicle 102. At the extended position 124b, the supplementary wiper 124 may be configured to be statically disposed proximally to the first end 106a of the windshield 106 and adjacent to the first A-pillar 108a so that the supplementary wiper 124 may prevent the water from passing over the first A-pillar 108a towards the side window 110 of the vehicle 102.

Figure 4:
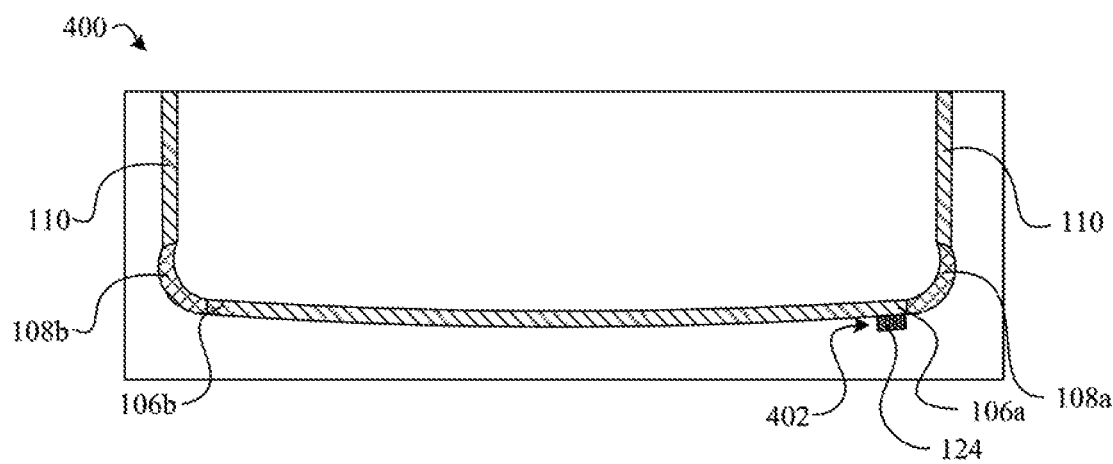
FIG. 4 is a diagram that illustrates a sectional view of the exemplary wiper system of FIG. 3, in accordance with an embodiment of the disclosure.

Additionally, or alternatively, in the active state, the driving assembly 122 may be configured to reciprocally swing the primary wiper arrangement 130 of the vehicle 102 about the second pivot point 122c of the driving assembly 122 to reciprocally sweep a defined windshield area along the width 106c of the windshield 106. Reciprocal sweeping action of the primary wiper arrangement 130 may push a portion of water or other agents from the defined windshield area towards the supplementary wiper 124 at the extended position 124b, where such a portion of water or other agents may accumulate near the wiper blade of the supplementary wiper 124. At the extended position 124b, the statically disposed supplementary wiper 124 may be configured to form a water column (as shown in FIG. 4, for example) with the windshield 106 to prevent the accumulated water from passing over the first A-pillar 108a of the vehicle 102 to the side window 110. Although, FIG. 2 shows a simple-arc reciprocal sweeping action 212 of the primary wiper arrangement 130, the present disclosure may also be applicable to any other sweeping action of the primary wiper arrangement 130, without deviating from the scope of the disclosure. Example of such sweeping actions may include, but are not limited to, a complex/eccentric-arc sweeping action, an opposite-sided sweeping action, a pantograph-based sweeping action, or a sequential sweeping action.

In the deactivation stage 206, the wiper system 104 may be configured to be deactivated back from the active state to the inactive state. When deactivated, the driving assembly 122 may be configured to stow the primary wiper arrangement 130 back from the simple-arc reciprocal sweeping action 212 to the resting position 208 or to a different resting position (such as the position 210). Also, the driving assembly 122 may be configured to stow the supplementary wiper 124 back from the extended position 124b to the resting position 208, which may be inside a compartment under the windshield cowl 112 of the vehicle 102 or directly above the windshield cowl 112 or the hood 114 of the vehicle 102. When stowed inside the compartment, the vehicle 102 may offer improved aesthetics with reduced air drag and/or wind noise.

The exemplary scenario 200 is illustrated as discrete stages of operations, such as the resting stage 202, the operational stage 204, and the deactivation stage 206. However, in certain embodiments, such discrete operations may be further divided into additional operations, combined into fewer operations, or eliminated, depending on the implementation without detracting from the essence of the disclosed embodiments.

FIG. 3 is a diagram of an exemplary wiper system, in accordance with an embodiment of the disclosure. FIG. 3 is explained in conjunction with elements from FIG. 1 and FIG. 2. With reference to FIG. 3, there is shown a diagram 300 of the vehicle 102 having a wiper system 302. The wiper system 302, as shown in FIG. 3, may have same components and/or functions as the wiper system 104 of FIG. 1. However, in the wiper system 302, the first pivot point 122b and the second pivot point 122c may coincide at a common position 304 on the wiper linkage 122a of the driving assembly 122. Whereas, in the wiper system 104, the first pivot point 122b and the second pivot point 122c may be located at two different positions on the wiper linkage 122a of the driving assembly 122 of FIG. 1. In the wiper system 302, the common position 304 of the first pivot point 122b and the second pivot point 122c may have a minimal requirement of mechanical components to form the driving assembly 122, so that, a service life of the driving assembly 122 may be improved.

FIG. 4 is a diagram that illustrates a sectional view of the exemplary wiper system of FIG. 3, in accordance with an embodiment of the disclosure. FIG. 4 is explained in conjunction with elements from FIGS. 1, 2, and 3. With reference to FIG. 4, there is shown a sectional view 400 of the wiper system 302 along a section line A-A'. The sectional view 400 of the wiper system 302 may also be applicable to the wiper system 104.

In the sectional view 400, the first A-pillar 108a may be flush with the first end 106a of the windshield 106 and the second A-pillar 108b may be flush with the second end 106b of the windshield 106. Such a flush configuration of the windshield 106 with the two A-pillars 108a-108b may eliminate drafting and/or wind noise in the vehicle 102 and may improve aerodynamics of the vehicle 102.

In the sectional view 400, there is also shown a water column 402. At the extended position 124b of the supplementary wiper 124, the supplementary wiper 124 may be configured to form the water column 402 with the windshield 106 to prevent the water from passing over the first A-pillar 108a of the vehicle 102 to the side window 110. Conventionally, grooves or channels may be formed between ends of a windshield and A-pillars to dispose water that may be falling on the windshield and moving towards either of the A-pillars. However, it has been observed that water which accumulates in such channels, crosses over the A-pillars to a side window, thereby obstructing a driver's view from the side window. In contrast, the supplementary wiper 124 itself may be configured to form the water column 402 with the windshield 106 and there may be no need for a separate channel between the windshield 106 and the two A-pillars 108a-108b.

Figure 5:
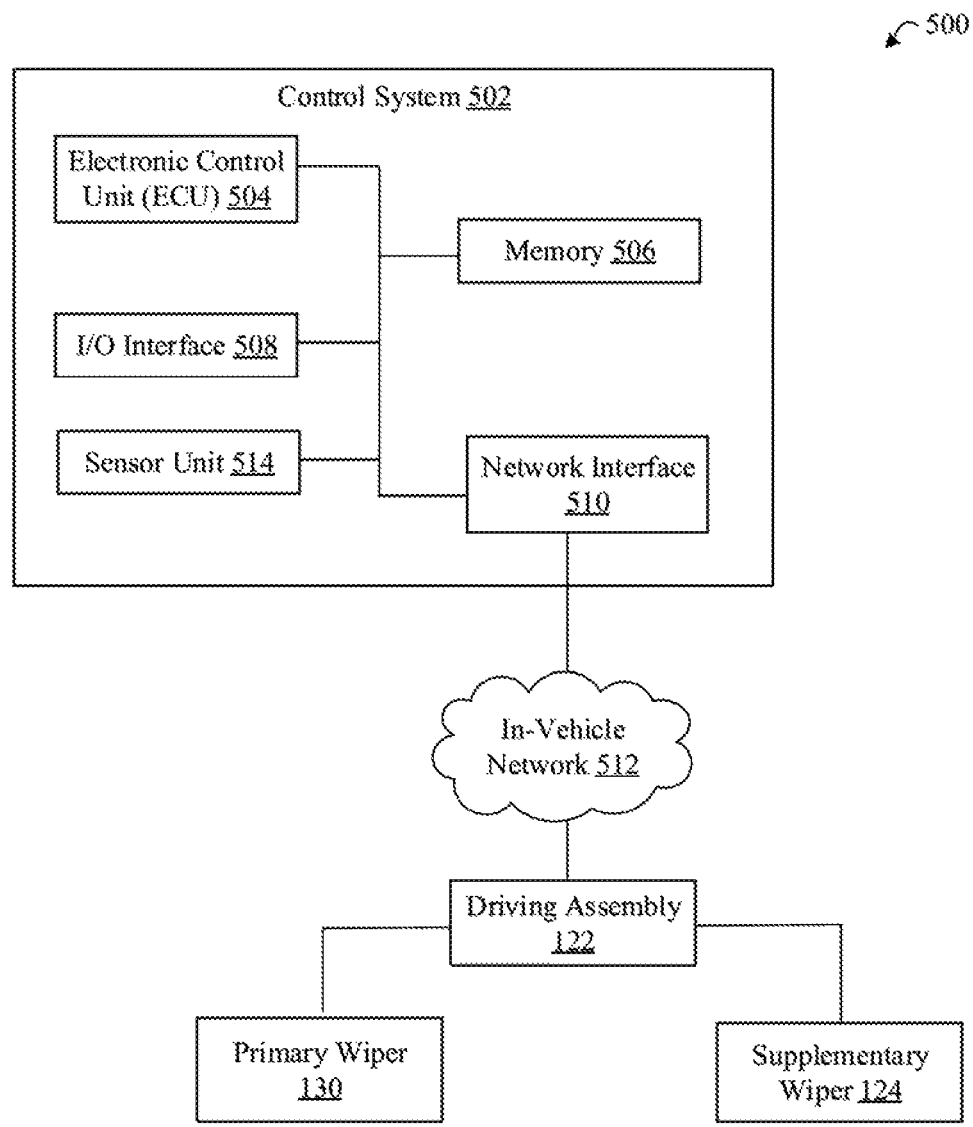
FIG. 5 is a block diagram of a control system that controls the exemplary wiper system of FIG. 1 or FIG. 3, in accordance with an embodiment of the disclosure.

FIG. 5 is a block diagram of a control system that controls the exemplary wiper system of FIG. 1 or FIG. 3, in accordance with an embodiment of the disclosure. FIG. 5 is explained in conjunction with elements from FIGS. 1, 2, 3, and 4. With reference to FIG. 5, there is shown a block diagram 500 of a control system 502. The control system 502 may include an Electronic Control Unit (ECU) 504, a memory 506, an input/output (I/O) interface 508, and a network interface 510. The network interface 510 may be communicatively coupled to the driving assembly 122, the primary wiper arrangement 130, and the supplementary wiper 124, through an in-vehicle network 512.

In an embodiment, the control system 502 may include a sensor unit 514, such as an optical sensor (not shown), which may be deployed on the windshield 106 to automatically detect rainfall and may control the actuation and movement of the supplementary wiper 124 and the primary wiper arrangement 130.

The control system 502 may include suitable logic, circuitry, and interfaces that may be configured to control, via the ECU 504, the driving assembly 122 for activation and deactivation of the wiper system 104. The control system 502 may also rely on human inputs or sensor information (e.g., rainfall detection) for controlling the driving assembly 122. In at least one embodiment, the control system 502 may be installed in the vehicle 102 and communicatively coupled to the in-vehicle network 512 of the vehicle 102.

The ECU 504 may include suitable logic, circuitry, and interfaces that may be configured to execute program instructions associated with different operations to be executed by the control system 502 for controlling the driving assembly 122. The ECU 504 may include one or more specialized processing units, which may be implemented as an integrated processor or a cluster of processors that perform the functions of the one or more specialized processing units, collectively. Such specialized processing units of the ECU 504 may be implemented based on a number of processor technologies known in the art. Examples of such implementations may be an x86-based processor, a Reduced Instruction Set Computing (RISC)

processor, an Application-Specific Integrated Circuit (ASIC) processor, a Complex Instruction Set Computing (CISC) processor, a microcontroller, a central processing unit (CPU), a Programmable Logical Control (PLC) Unit, a Graphics Processing Unit (GPU), and/or other control circuits. In an embodiment, ECU 504 may have three relays: a high-speed circuit, a low-speed circuit and an intermittent circuit. Based on driver requirements or inputs, the ECU 504 may be configured to control the actuation and speed of the wiper system 104.

The memory 506 may include suitable logic, circuitry, and interfaces that may be configured to store the program instructions to be executed by the ECU 504. The memory 506 may be configured to store control information for the supplementary wiper 124 and the primary wiper arrangement 130 of the wiper system 104. Examples of implementation of the memory 506 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O interface 508 may include suitable logic, circuitry, and interfaces that may be configured to receive a human input from a driver and/or a passenger of the vehicle 102 for selection of one or more options which may be associated with the control of the wiper system 104. For example, some of the options may include an activation option for the wiper system 104, a deactivation option for the wiper system 104, a speed control for movement of the primary wiper arrangement 130, an attack angle of the primary wiper arrangement 130, and the like. The I/O interface 508 may be coupled either adjacent to the driver seat 116 or the passenger seat 118. The I/O interface 508 may include various input and output devices, which may be configured to communicate with the ECU 504. Examples of the I/O interface 508 may include, but are not limited to, a touch-based display, a multi-information display (MID), an automotive heads-up display (HUD), an instrument cluster, or a dedicated control panel for the control system 502.

The network interface 510 may include suitable logic, circuitry, and interfaces that may be configured to facilitate communication among the ECU 504, the driving assembly 122, or any other networking device in the vehicle 102 or outside the vehicle 102. The network interface 510 may be implemented by use of various known technologies to support wired or wireless communication of the driving assembly 122 with the ECU 504.

In at least one embodiment, the network interface 510 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 510 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The in-vehicle network 512 may include a medium through which the various control units, components, and/or systems of the vehicle 102 may communicate with each other. In accordance with an embodiment, in-vehicle communication may occur by use of Media Oriented Systems Transport (MOST) multimedia network protocol of the in-vehicle network 512 or other suitable network protocols for vehicle communication. The MOST-based network may be a separate network from the controller area network (CAN). In accordance with an embodiment, the MOST-based network, the CAN, and other in-vehicle networks may co-exist in the vehicle 102. The in-vehicle network 512 may facilitate access control and/or communication among the ECU 504 of the control system 502, the driving assembly 122, the sensor unit 514, the network interface 510, OBUs, or other ECUs, such as Engine Control Module (ECM) or a telematics control unit (TCU) of the vehicle 102.

Various devices or components in the vehicle 102 may connect to the in-vehicle network 512, in accordance with various wired and wireless communication protocols. Examples of the wired and wireless communication protocols for the in-vehicle network 512 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

In operation, the ECU 504 may receive a human input to activate the wiper system 104 based on sensor information acquired via the sensor unit 514. The sensor information may be indicative of a rainfall or accumulation of water on the windshield 106 of the vehicle 102. In at least one embodiment, the ECU 504 may receive human inputs via the I/O interface 508. Such inputs may include a selection of the one or more options which may be associated with the control of the wiper system 104. Based on the sensor information or the human inputs, the ECU 504 may be configured to control the driving assembly 122 to swing the supplementary wiper 124 about the first pivot point 122b of the driving assembly 122, from the resting position 208 to the extended position 124b. The supplementary wiper 124 may have the first end 124a that may be coupled to the first pivot point 122b. At the extended position 124b, the supplementary wiper 124 may be configured to be statically disposed adjacent to the first A-pillar 108a of the vehicle 102 to prevent water from passing over the first A-pillar 108a of the vehicle 102 to the side window 110 of the vehicle 102.

In some instances, the sensor information may indicate that the rainfall has stopped. Alternatively, a human input to deactivate the driving assembly 122 may be received via the I/O interface 508. Based on the sensor information or the human input, the ECU 504 may further control the driving assembly 122 to stow the supplementary wiper 124 back from the extended position 124b to the resting position 208.

Figure 6:
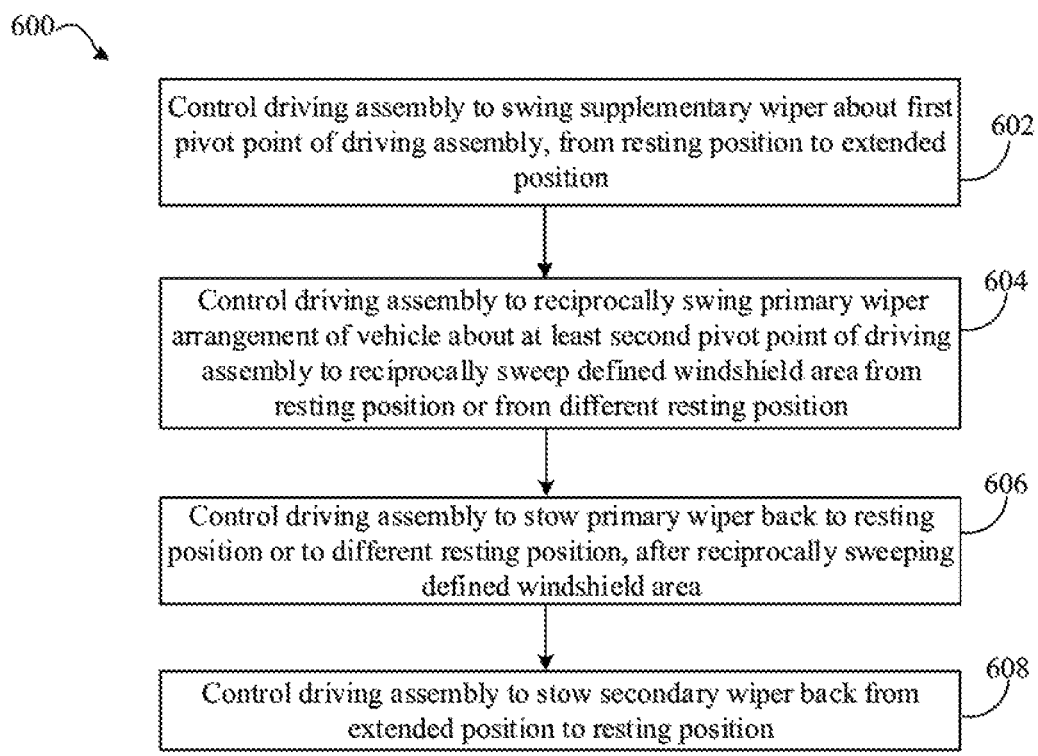
FIG. 6 is a flowchart that illustrates an exemplary method for controlling a driving assembly of a wiper system, in accordance with an embodiment of the disclosure.

FIG. 6 is a flowchart that illustrates an exemplary method for controlling a driving assembly of a wiper system, in accordance with an embodiment of the disclosure. FIG. 6 is explained in conjunction with elements from FIGS. 1, 2, 3, 4, and 5. With reference to FIG. 6, there is shown a flowchart 600 that depicts an exemplary method for controlling the driving assembly 122 of the wiper system 104 of FIG. 1. The method illustrated in the flowchart 600 may start from 602.

At 602, the driving assembly 122 may be controlled to swing the supplementary wiper 124 about the first pivot point 122b of the driving assembly 122, from the resting position 208 to the extended position 124b. In an embodiment, the control system 502 may be configured to control the driving assembly 122 to swing the supplementary wiper 124 about the first pivot point 122b of the driving assembly 122, from the resting position 208 to the extended position 124b.

At 604, the driving assembly 122 may be controlled to reciprocally swing the primary wiper arrangement 130 of the vehicle 102 about at least the second pivot point 122c of the driving assembly 122 to reciprocally sweep a defined windshield area along the width 106c of the windshield 106 from the resting position 208 or from a different resting position. In an embodiment, the control system 502 may be configured to control the driving assembly 122 to reciprocally swing the primary wiper arrangement 130 of the vehicle 102 about at least the second pivot point 122c of the driving assembly 122 to reciprocally sweep a defined windshield area along the width 106c of the windshield 106.

At 606, the driving assembly 122 may be controlled to stow the primary wiper arrangement 130 back to the resting position 208 or to a different resting position (such as the position 210) after reciprocally sweeping the defined windshield area. In an embodiment, the control system 502 may be configured to control the driving assembly 122 to stow the primary wiper arrangement 130 back to the resting position 208 or to different resting position after reciprocally sweeping the defined windshield area.

At 608, the driving assembly 122 may be controlled to stow the supplementary wiper 124 back from the extended position 124b to the resting position 208. In an embodiment, the control system 502 may be configured to control the driving assembly 122 to stow the supplementary wiper 124 back from the extended position 124b to the resting position 208. Control may pass to end.

The flowchart 600 is illustrated as discrete operations, such as 602, 604, 606, and 608. However, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer readable medium and/or storage medium having stored thereon, instructions executable by a machine and/or a computer to operate the driving assembly 122 of the wiper system 104. The instructions may cause the machine and/or computer to perform operations that include controlling the driving assembly 122 to swing the supplementary wiper 124 about the first pivot point 122b of the driving assembly 122, from the resting position 208 to the extended position 124b. The operations may further include controlling the driving assembly 122 to reciprocally swing the primary wiper arrangement 130 of the vehicle 102 about at least the second pivot point 122c of the driving assembly 122 to reciprocally sweep a defined windshield area along the width 106c of the windshield 106 from the resting position 208. The operations may further include controlling the driving assembly 122 to stow the primary wiper arrangement 130 back to the resting position 208, after reciprocally sweeping the defined windshield area. The operations may further include controlling the driving assembly 122 to stow the supplementary wiper 124 back from the extended position 124b to the resting position 208.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a situation or material to the teachings of the present disclosure without departing from its scope. Therefore, it is intended that the present disclosure may not be limited to the embodiment disclosed, but that the present disclosure will include all embodiments that fall within the scope of the appended claims.

What is claimed is:

1. A wiper system for a vehicle, comprising:
a driving assembly, further comprising:
a driving implement,
a wiper linkage, and
a gear mechanism;
a supplementary wiper having a first end coupled to a first pivot point of the driving assembly, and
a primary wiper arrangement having a first end coupled to a second pivot point of the driving assembly that coincides at a common position as the first pivot point; wherein
when activated to an active state, the driving assembly is configured to swing the supplementary wiper about the first pivot point from a resting position proximal to a windshield cowl of the vehicle to an extended position that is proximal to a first end of a windshield and adjacent to one of two A-pillars of the vehicle, and the driving assembly is configured to reciprocally swing the primary wiper arrangement about the second pivot point,
the supplementary wiper is configured to be statically disposed at the extended position while the wiper system is in the active state to prevent water from passing over one of the two A-pillars of the vehicle to a side window of the vehicle, and
when deactivated to an inactive state, the driving assembly is configured to stow the supplementary wiper back from the extended position to the resting position.

2. The wiper system according to claim 1, wherein the primary wiper arrangement is configured to reciprocally sweep a defined windshield area extending from a second resting position proximal to the windshield cowl to a second extended position adjacent the supplementary wiper at the extended position.

3. The wiper system according to claim 2, wherein the first pivot point and the second pivot point are located on the wiper linkage of the driving assembly.

4. The wiper system according to claim 1, wherein the two A-pillars are on a front side of the vehicle and comprise a first A-pillar that is proximal to a driver's seat of the vehicle and a second A-pillar that is proximal to a passenger's seat on the front side.

5. The wiper system according to claim 4, wherein the extended position of the supplementary wiper is adjacent to the first A-pillar.

6. The wiper system according to claim 4, wherein
the first A-pillar is configured to be flush with the first end of the windshield, and
the second A-pillar is configured to be flush with a second end of the windshield.

7. The wiper system according to claim 1, wherein, at the extended position, the supplementary wiper is configured to form a water column with the windshield to prevent the water from passing over one of the two A-pillars of the vehicle to the side window.

8. The wiper system according to claim 1, wherein the supplementary wiper is configured to extend at the extended position to substantially cover a width of the windshield.

9. The wiper system according to claim 1, wherein the resting position is directly above the windshield cowl.

10. The wiper system according to claim 1, wherein
the resting position is inside a compartment that is directly beneath a hood of the vehicle, and
when deactivated, the driving assembly is configured to stow the supplementary wiper to the resting position inside the compartment.

11. The wiper system according to claim 1, wherein the driving implement is an electric motor.

12. The wiper system according to claim 1, wherein the gear mechanism is configured to transform a rotational movement of the driving implement to a linear movement of the wiper linkage.

13. The wiper system according to claim 1, wherein the gear mechanism includes a worm gear.

14. The wiper system according to claim 1, wherein the gear mechanism includes a bevel gear.

15. A wiper system for a vehicle, comprising:
a driving assembly that includes an electric motor, a wiper linkage, and a gear mechanism;
a control system communicatively coupled to the driving assembly;
a supplementary wiper having a first end coupled to a wiper pivot point of the driving assembly; and
a primary wiper having a first end coupled to the wiper pivot point of the driving assembly; wherein
the control system is configured to differentially control movement of the supplementary wiper and the primary wiper about the wiper pivot point;
when the wiper system is activated to an active state:
the driving assembly is configured to swing the supplementary wiper about the wiper pivot point from a first resting position proximal to a windshield cowl of the vehicle to a first extended position adjacent to a first end of a windshield that is proximal to a driver's seat of the vehicle,
the supplementary wiper is configured to be statically disposed at the extended position while the wiper system is in the active state, and
the driving assembly is configured to reciprocally swing the primary wiper about the wiper pivot point to reciprocally sweep a defined windshield area extending from a second resting position adjacent the first resting position of the supplementary wiper to a second extended position adjacent the supplementary wiper at the first extended position; and
when the wiper system is deactivated to an inactive state, the driving assembly is configured to stow the primary wiper to the second resting position, and also stow the supplementary wiper from the first extended position to the first resting position.

* * * * *